United States Patent [19]

Cannaux et al.

[11] Patent Number: 4,541,413

[45] Date of Patent: Sep. 17, 1985

[54] PUMP AND CONTROL UNIT FOR A SOLAR HEATING INSTALLATION FOR A WATER TANK, AND PARTICULARLY FOR A SWIMMING POOL

[75] Inventors: Guy Cannaux, Antibes; Gerard Calvet, Valbonne, both of France

[73] Assignee: Compagnie Francaise de Raffinage, Paris, France

[21] Appl. No.: 597,069

[22] PCT Filed: Jul. 8, 1983

[86] PCT No.: PCT/FR83/00142

§ 371 Date: Mar. 8, 1984

§ 102(e) Date: Mar. 8, 1984

[30] Foreign Application Priority Data

Jul. 9, 1982 [FR] France ............................. 82 12061

[51] Int. Cl.$^4$ .............................................. F24J 3/02
[52] U.S. Cl. .................................... 126/422; 126/416; 126/419; 126/437
[58] Field of Search ............... 126/416, 419, 422, 432, 126/437, 434; 165/18, 40; 236/91 F

[56] References Cited

U.S. PATENT DOCUMENTS 4,061,132 12/1977 Ashton et al. ...................... 126/419
4,063,545 12/1977 Hapgood ............................. 126/427
4,210,125 7/1980 Fender ................................ 126/437

FOREIGN PATENT DOCUMENTS 2312741 12/1976 France .
2483581 12/1981 France ................................ 126/419
2496847 6/1982 France .

Primary Examiner—Margaret A. Focarino
Attorney, Agent, or Firm—Curtis, Morris & Safford

[57] ABSTRACT

The invention relates to a pump and control unit for a solar heating installation system for a water tank, particularly for a swimming pool. The system contains a solar collector, a hydraulic circuit which includes an outward-flow pipe, a return-flow pipe, a pump, a derivative-action control unit and two sensors mounted on the outward-flow pipe and on the return-flow pipe, respectively. The pump, the control unit and the two sensors are integrated into a single case. The case is provided in its top wall with a transparent opening which faces the return-flow sensor and through which said sensor can be exposed to solar radiation, such that the pump may be automatically activated during periods of sunshine, i.e., when the solar collector is heating the water returning to the tank, and stopped due to lack of sunshine.

9 Claims, 4 Drawing Figures

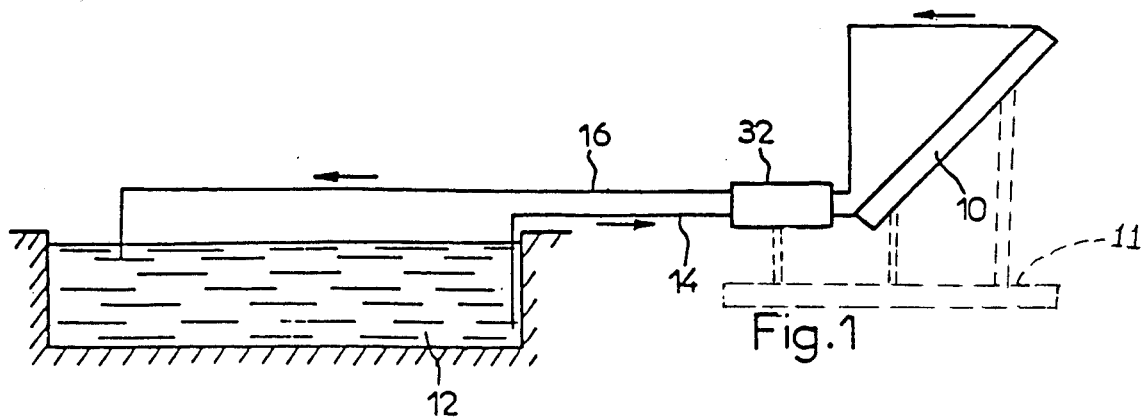
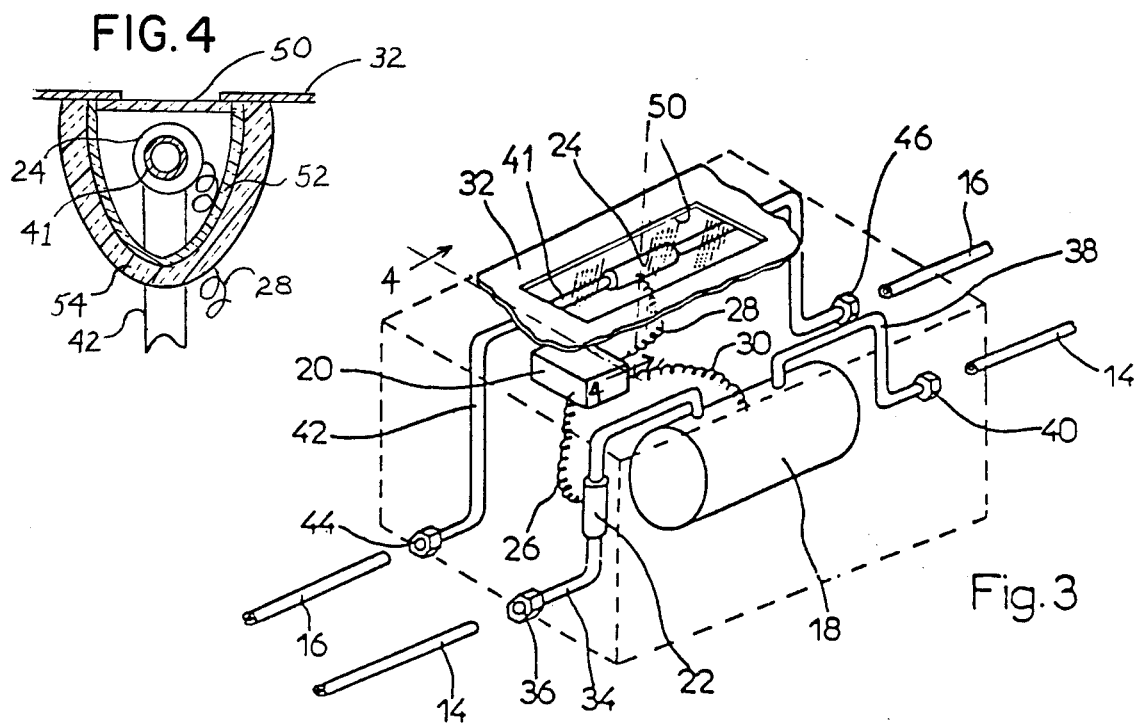
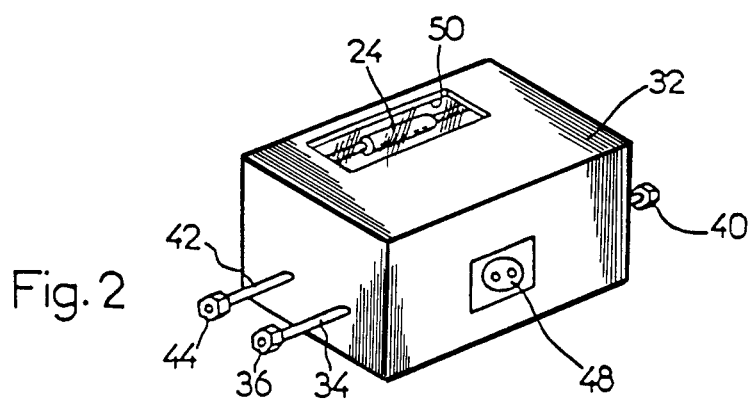

4,541,413

PUMP AND CONTROL UNIT FOR A SOLAR HEATING INSTALLATION FOR A WATER TANK, AND PARTICULARLY FOR A SWIMMING POOL

The present invention relates to a pump and control unit intended for the heating of a water tank, and particularly but not exclusively of a swimming pool.

The prior-art solar heating installations generally comprise one or more solar collectors for converting the energy from solar radiation into heat; a hydraulic circuit which comprises an outward-flow pipe connecting the tank to the inlet of the collectors and a return-flow pipe connecting the outlet of the collectors to the tank; a pump which circulates the water from the tank through said hydraulic circuit; and a derivative-action control unit which is electrically connected to the motor and to two sensors mounted on the outward-flow pipe and on the return-flow pipe, respectively.

As a rule, the outward-flow sensor is located in the tank itself, and the return-flow sensor at the outlet of the collectors.

The installation of such a system involves, in the case of a swimming pool, mounting the sensors on the outward-and return-flow pipes, electrically connecting these sensors to the control unit and the latter to the pump, and calibrating the control unit. These operations are time-consuming and delicate and require considerable skill.

The present invention has as its object a monobloc pump and solar control unit to be furnished ready for use without any of these operations having to be performed.

To this end, in one embodiment the unit in accordance with the invention is characterized in that the pump, the control unit and the two sensors are integrated into a single case which is traversed by the outward- and return-flow pipes; that the electrical connections between the control unit, the sensors and the pump motor are prewired; and that said case is provided with a transparent opening facing the return-flow sensor through which the latter can be insolated.

Because of the minimum protection distance to be maintained around the swimming pool, the pump and control unit of the invention should be located near the collectors and thus may be regarded as being exposed to as much solar radiation as the collectors. Similarly, the temperature detected by the outward-flow sensor will be practically the same as that of the water in the pool. The unit of the invention thus is a true simulator which permits collector and pool temperatures to be detected that are close to the actual temperatures and derivative-action control to be effected as in a conventional installation.

Installation of the unit requires no skill and therefore can be carried out by the user himself. All he has to do is to hydraulically connect the pipe sections to the outward- and return-flow pipes and to run an electrical extension from the utility power system to the unit.

One embodiment of the invention will now be described in greater detail with reference to the accompanying drawing, wherein:

FIG. 1 is a diagrammatic representation of a heating installation for a swimming pool which uses a pump and control unit in accordance with the invention (showing an optional orientation apparatus in dotted outline);

FIG. 2 is a perspective view of said pump and control unit; and

FIG. 3 is a perspective view showing the layout of the various components of the unit in the interior of the case.

FIG. 4 is a modified embodiment of the control unit shown in FIG. 3 as though viewed along dotted section line 4—4 of FIG. 3. (illustrating an insulated parabolic mirror).

The description which follows relates to the heating of a swimming pool but obviously is fully applicable to the heating of any other water tank.

The installation comprises one or more solar energy collectors 10 which are hydraulically connected to a swimming pool 12 through an outward-flow pipe 14 starting at the bottom of the pool and by a return-flow pipe 16 connected to the outlet of the collectors and terminating at the surface of the pool.

The pool water is circulated through the circuit so formed by means of a pump 18 inserted in the outward-flow pipe 14. The cold water from the pool thus is drawn in by the pump 18 and piped to the collectors 10, where it is heated. The water so heated is piped to the pool, and the temperature of the latter thus gradually rises.

The operation of the pump is controlled conventionally by a derivative-action control unit 20 which is electrically connected, through conductors 26 and 28, to a first, outward-flow sensor 22 mounted on the outward-flow pipe 14 and to a second, return-flow sensor 24 mounted on the return-flow pipe 16. The control unit 20 is further electrically connected to the pump 18 through a conductor 30. The control unit 20 is adjusted so that when the temperature detected by the return-flow sensor 24 exceeds that detected by the outward-flow sensor 26 by more than a set value, it actuates the pump and when the temperature difference drops below a second set value, the control unit stops the pump.

In accordance with the invention, the pump 18, the control unit 20 and the two sensors are integrated into a case 32. The control unit is precalibrated by the manufacturer and prewired with respect to the electrical connections 26, 28 and 30. The outward-flow sensor 22 is mounted on a pipe section 34 which is connected to the suction opening of the pump and whose other end projects outwardly from the case. A fitting 36 attached to that end is intended to couple it to the outward-flow pipe 14 on the pool side. A pipe section 38 connected to the discharge opening of the pump is likewise provided at its end with a fitting 40, for coupling to the outward-flow pipe on the collector side.

In accordance with an important characteristic of the invention, the return-flow sensor 24 is mounted on the central portion 41 of an arched or U-shaped pipe section 42 accommodated in the case 32, the other two portions of the pipe section terminating outside the case, their ends being provided with fittings 44 and 46 for coupling to the return-flow pipe 16 on the pool and collector sides, respectively.

Said central portion and the sensor mounted in it extend just below an elongated transparent opening 50 provided in the top wall of the case so that they are heated with maximum efficiency by insolation.

Because of the stratification of the warm water which occurs there when the pump is stopped, the arched shape of the pipe section further permits heat loss to the rest of the piping to be avoided.

Any means known to those skilled in the art may be employed to improve the reception of solar heat by the sensor 24. For example, a parabolic reflector 52 which reflects the radiation toward the sensor, or even an insulating material 54, may be mounted under the sensor.

The pump and control unit is advantageously located near the collectors so that the insolated sensor 24 can detect a temperature as close as possible to that prevailing at the collectors. When a sun-tracking motion is imparted to the collectors, it is desirable that the pump and control unit be mechanically integral with the collectors, for example by an orientation apparatus 11, and oriented so that the transparent opening 50 faces the sun at all times.

The pump and control unit as delivered is in the form of a parallelepipedal box from which the ends of pipe sections project, provided with fittings. To place it into service, the user need only make the hydraulic connections and plug an electric cable connected to the utility power system into the power receptacle 48 of the control unit.

The principle of operation of the installation is as follows:

During periods of sunshine, the insolated sensor 24 is heated by the solar radiation which passes through the opening 50. There will be a difference between the temperatures of the sensors 22 and 24. As soon as that temperature difference exceeds a first set value, the derivative-action control unit 20 starts the pump 18. So long as the temperature difference is above a second set value, the pump of the unit will continue to operate.

When this temperature difference drops below a second set value, due to lack of sunshine, the circulating pump is stopped.

The pump is restarted when the temperature difference again rises above the first set value, and so forth.

It should be noted that the first and second set values may be equal. On the other hand, the second set value may be lower than the first.

We claim:

1. A pump and control unit for a solar heating installation for a water tank, such as for a swimming pool, said installation having at least one solar collector for converting the energy from solar radiation into heat, a hydraulic circuit containing an outward-flow pipe connecting the tank to the inlet of the collector and a return-flow pipe connecting the outlet of the collector to the tank, a pump which circulates the water from the tank through said hydraulic circuit, and a derivative-action control unit which is electrically connected to the pump and to two sensors mounted on the outward-flow pipe and on the return-flow pipe, respectively; said unit comprising said pump, derivative-action control unit and two sensors all contained in a single opaque case which is traversed by a section of said outward-flow pipe and a section of said return-flow pipe and which is provided in its top wall with a transparent opening through which said sensor on the section of return-flow pipe can be insolated, said section of return-flow pipe which carries the return-flow sensor being in the form of an arch or of an inverted U, the sensor being mounted on the central portion of said arch and extending just below said opening.

2. A pump and control unit as defined in claim 1, wherein the electrical connections between the derivative-action control unit, the sensors and the motor are prewired.

3. A pump and control unit according to claim 1, wherein the outward- and return-flow sensors are mounted on separate pipe sections having end fittings which pipe sections are accommodated within the case and whose ends project outwardly from the case for coupling respectively into the outward- and return-flow pipes.

4. A pump and control unit according to claim 1, further comprising means for improving reception of heat by the return-flow sensor.

5. A pump and control unit according to claim 4, wherein said means comprises of a parabolic surface disposed under the return-flow sensor.

6. A pump and control unit according to claim 4, wherein said means comprises of an insulating material.

7. A pump and control unit according to claim 1, wherein the case is mounted near the collector.

8. A pump and control unit according to claim 7, further comprising means for mechanically integrating the unit and the collector so that the transparent opening is oriented in cooperation with the collector to face the sun.

9. A method of conserving heat in the pipes of a solar heating installation for a water tank such as a swimming pool, said installation having at least one solar collector for converting the energy from solar radiation into heat, a hydraulic circuit containing an outward-flow pipe connecting the tank to the inlet of the collector and a return-flow pipe connecting the outlet of the collector to the tank, a pump which circulates the water from the tank through said hydraulic circuit, and a derivative-action control unit which is electrically connected to the pump and to two sensors mounted on the outward-flow pipe and on the return-flow pipe, respectively; said unit containing said pump, derivative-action control unit and two sensors all contained in a single opaque case which is traversed by a section of said outward-flow pipe and a section of said return-flow pipe and which is provided in its top with a transparent opening through which said sensor on the section of return-flow pipe can be insolated; which method comprises using in said unit a return-flow pipe having the form of an arch such that heated hydraulic flow in the circuit is blocked when the pump is stopped.

* * * * *